United States Patent
Benton (10) Patent No.: US 11,169,030 B2
(45) Date of Patent: Nov. 9, 2021

(54) LASER DETECTION SYSTEM

(71) Applicant: ASTON UNIVERSITY, Birmingham (GB)

(72) Inventor: David Benton, Birmingham (GB)

(73) Assignee: ASTON UNIVERSITY, Birmingham (GB)

(*) Notice: Subject to any disclaimer, the term of this patent is extended or adjusted under 35 U.S.C. 154(b) by 0 days.

(21) Appl. No.: 16/811,800

(22) Filed: Mar. 6, 2020

(65) Prior Publication Data

US 2020/0278258 A1 Sep. 3, 2020

Related U.S. Application Data

(63) Continuation of application No. PCT/EP2018/074226, filed on Sep. 7, 2018.

(30) Foreign Application Priority Data

Sep. 7, 2017 (GB) ..................................... 1714371

(51) Int. Cl.
*G01B 9/02* (2006.01)
*G01J 9/02* (2006.01)
(Continued)

(52) U.S. Cl.
CPC ........... *G01J 9/0246* (2013.01); *G01J 1/4257* (2013.01); *G01S 7/483* (2013.01);
(Continued)

(58) Field of Classification Search
CPC ............. G01J 9/0246; G01J 2009/0249; G01J 2009/0288; G01J 1/4257; G01B 9/0201;
(Continued)

(56) References Cited

U.S. PATENT DOCUMENTS

| 4,309,108 A | 1/1982 | Siebert |
| 4,531,196 A * | 7/1985 | Lin ......................... G06E 3/005 |
| | | 359/285 |

(Continued)

FOREIGN PATENT DOCUMENTS

| CN | 202793602 U | 3/2013 |
| EP | 0349343 A2 | 1/1990 |

(Continued)

OTHER PUBLICATIONS

"Laser Incidents Reported to the UK CAA", 1400 Incidents in the UK, Available online at: http://www.caa.co.uk/Data-and-analysis/Safety-and-security/Datasets/Laser-incidents/, 2014, 2 pages.

(Continued)

*Primary Examiner* — Tarifur R Chowdhury
*Assistant Examiner* — Jonathon Cook
(74) *Attorney, Agent, or Firm* — Kilpatrick Townsend & Stockton LLP (57) ABSTRACT

A laser detection system and method of two way communication comprising: a Mach Zehnder interferometer, the Mach Zehnder interferometer comprising: an entry beam splitter for splitting incident light into a first arm, having an arm length L1 and a second arm having an arm length L2; a modulation stage for receiving a modulation signal and applying a phase difference to the second arm, the magnitude of the phase difference depending upon the magnitude of the modulation signal; an exit beam splitter for recombining light from the first arm with light from the second arm to create a first output and a second output; a detection stage comprising a first detector at the first output for detecting intensity modulation caused by interference of the recombined light; and a signal processor communicably connected to both the modulation stage and the detection stage.

20 Claims, 3 Drawing Sheets

(51) Int. Cl.
*G01J 1/42* (2006.01)
*G01S 7/483* (2006.01)

(52) U.S. Cl.
CPC .......... *G01J 2001/4247* (2013.01); *G01J 2009/0249* (2013.01); *G01J 2009/0288* (2013.01)

(58) Field of Classification Search
CPC .......... G01B 2290/15; G01B 2290/45; G01S 7/4806; G01S 7/493; G01S 7/483; G01S 7/486
See application file for complete search history.

(56) References Cited

U.S. PATENT DOCUMENTS

| | | | |
|---|---|---|---|
| 4,600,307 | A | 7/1986 | Krohn et al. |
| 4,998,255 | A | 3/1991 | Gerstenberger et al. |
| 5,017,006 | A | 5/1991 | Poisel et al. |
| 5,121,248 | A | 6/1992 | Mohon et al. |
| 5,192,982 | A * | 3/1993 | Lapucci .......... G01J 9/02 356/520 |
| 5,239,364 | A | 8/1993 | Matsuzaki |
| 7,420,688 | B2 * | 9/2008 | Jungwirth .......... G01J 1/02 356/496 |
| 2005/0180470 | A1 | 8/2005 | Sadot et al. |
| 2008/0198386 | A1 * | 8/2008 | Hirata .......... G01B 9/02051 356/491 |
| 2008/0304139 | A1 | 12/2008 | Suzuki et al. |
| 2017/0356735 | A1 | 12/2017 | Yamauchi et al. |

FOREIGN PATENT DOCUMENTS

| | | |
|---|---|---|
| EP | 0851205 A2 | 7/1998 |
| GB | 2275332 A | 8/1994 |
| GB | 2332744 A | 6/1999 |
| JP | 0363607 A | 3/1991 |
| JP | 10186416 A | 7/1998 |
| WO | 2009132398 A1 | 11/2009 |
| WO | 2010031163 A1 | 3/2010 |
| WO | 2016121248 A1 | 8/2016 |
| WO | 2018014325 A1 | 1/2018 |

OTHER PUBLICATIONS

Benton, "Concurrent Codes: A Holographic-Type Encoding Robust Against Noise and Loss", PLOS One, Available online at: https://journals.plos.org/plosone/article/file?id=10.1371/journal.pone.0150280&type=printable, Mar. 1, 2016, 20 pages.
Cohen, "Electrooptic Detector of Temporally Coherent Radiation", Applied Optics, vol. 30, No. 7, Mar. 1, 1991, pp. 874-883.
Crane, "Laser Detection by Coherence Discrimination", Optical Engineering, vol. 18, No. 2, Apr. 1979, pp. 212-217.
Crane Jr., "Fabry Perot Etalon can Provide a Method for Detecting Laser Pulses", 1979.
Duffy, et al., "A Temporal Coherence-Based Optical Sensor", Sensors and Actuators, vol. 18, No. 1, Jun. 1, 1989, pp. 17-31.
GB1614743.1, "Search Report", dated Feb. 6, 2017, 4 pages.
GB1714371.0, "Search Report", dated Feb. 14, 2018, 4 pages.
Manasson, et al., "Laser Warning Receiver Based on Coherence Discrimination", Proceedings of the Institute of Electrical and Electronics Engineers 1996 National Aerospace and Electronics Conference, 1996, pp. 869-873.
PCT/EP2018/074226, "International Search Report and Written Opinion", dated Mar. 5, 2019, 20 pages.

* cited by examiner

LASER DETECTION SYSTEM

CROSS-REFERENCES TO RELATED APPLICATIONS

This application claims priority to and is a continuation of International Patent Application No. PCT/EP2018/074226, filed Sep. 7, 2018, which claims priority from GB Patent Application No. 1714371.0, filed Sep. 7, 2017, the entire contents of which are hereby incorporated by reference in their entirety for all purposes.

TECHNICAL FIELD OF THE INVENTION

The present invention relates to a laser detection system, more particularly to a laser detection system comprising a Mach Zehnder interferometer for detecting laser radiation from background radiation where the laser radiation is significantly weaker in strength than the background radiation.

BACKGROUND OF THE INVENTION

The detection and identification of laser radiation has been pursued for decades, with many advances in the field being driven by military requirements. However, over the last decade, there has been a rise in the need to detect continuous wave (CW) lasers in a wide range of scenarios.

In military scenarios, the requirements of laser detection systems are often different from the requirements of non-military scenarios. For example, military lasers can typically be used for targeting, range finding, designation and missile control which means there is an inherent need for long range effective operation over many kilometers thereby resulting in the use of high power pulsed lasers. A laser detection system optimized for detecting such high powered military lasers is likely to be less effective at detecting low power laser radiation, particularly laser radiation close to or below background levels of radiation. Military laser warner receivers have been developed to detect the threat posed by incident lasers and to initiate appropriate countermeasures determined by the perceived threat.

One example of a scenario in which the need for better detection of CW lasers arises is within the field of laser microphones. Laser microphones are surveillance tools that work by detecting the sound vibrations produced on a distant object such as a window by conversations and other sounds near the object. The microphones can be used to eavesdrop on conversations from tens of meters away or more and as their technology increases, so too does the desire to develop detection systems to detect the presence of such eavesdropping tools and therefore mitigate any associated security risk.

Another scenario in which improved laser detection systems would be useful relates to laser diode pointers, particularly those with powers in excess of 1 W. According to civil aviation authority reports, the number of incidents of aircraft and pilots being illuminated by lasers is increasing every year with over 1400 incidents in the UK in 2014 (http://www.caa.co.uk/Data-and-analysis/Safety-and-security/Datasets/Laser-incidents/). This poses a significant risk to pilot and passenger eyesight with serious potential consequences. Military grade laser warning receiver systems have a limited capability against this particular threat, especially in conditions of bright sunlight background illumination where the relative power of the laser pointer is not so high. Again, there is therefore the desire for a laser detection system capable of discriminating laser radiation from background radiation when the laser radiation is as low as one or more orders of magnitude weaker than any background radiation.

Certain aspects of pre-existing systems that are important in military scenarios may not be relevant for non-military solutions. For example, in a high risk military scenario, it is imperative that the laser is detected rapidly so that protective action can be initiated in time to save lives. The scenarios detailed above in connection to CW lasers do not have this same restriction and can allow for a period of signal integration. This is therefore the motivation for providing a laser detection system which is optimized for low cost operation, and therefore for widespread non-military usage.

Properties of laser light include: high spectral brightness; low divergence; and high coherence. Various known interferometric methods make use of the coherence properties of laser light in order to enable it to be discriminated from the incoherent background light.

It is known that an angle tuned stepped Fabry Perot etalon can provide a method for detecting laser pulses (Crane Jr, R. (1979), Laser detection by coherence discrimination. Optical Engineering, 18(2), 182212; W. T. Krohn et al., "Coherent radiation detecting apparatus," U.S. Pat. No. 4,600,307 (Jul. 15, 1986); and E. Z. Seibert, "Analyzer for coherent radiation," U.S. Pat. No. 4,309,108 (Jan. 5, 1982)). It is also known that the Fabry Perot effect can be utilized in the form of an electrooptic crystal (V. A. Manasson, L. S. Sadovnik, J. H. P. (2001). Laser Warner receiver Based on coherence Discrimination. IEEE, 46, 45-46)

A Mach Zehnder type interferometer with an electro optic phase modulator in one arm to detect coherent radiation in an optical fiber system has previously been proposed (U.S. Pat. No. 5,017,006). Another known system (Cohen, J. D. (1991). Electrooptic detector of temporally coherent radiation. Applied Optics, 30(7), 874-883. http://doi.org/10.1364/AO.30.000874) used a birefringent modulator system to detect weak coherent light against a bright incoherent background.

SUMMARY OF THE INVENTION

The present invention aims to solve the above problems by providing, according to a first aspect, a laser detection system comprising: a Mach Zehnder interferometer, the Mach Zehnder interferometer comprising: an entry beam splitter for splitting incident light into a first arm, having an arm length L1 and a second arm having an arm length L2; a modulation stage for receiving a modulation signal and applying a phase difference to the second arm, the magnitude of the phase difference depending upon the magnitude of the modulation signal; an exit beam splitter for recombining light from the first arm with light from the second arm to create a first output and a second output; a detection stage comprising a first detector at the first output for detecting intensity modulation caused by interference of the recombined light; and a signal processor communicably connected to both the modulation stage and the detection stage.

In this way, a low cost laser detection system is provided which is capable of detecting laser radiation with a power which is equal to, less than, and/or significantly less than (i.e. at least an order of magnitude less than) the power of background radiation.

The modulating signal is preferably produced at the signal processor and subsequently sent to the modulation stage. However, it is envisaged that it could be produced separately at a separate signal generator and could then be sent to both the modulation stage and the signal processor. The modulation stage responds directly to the received modulation signal.

The communication connection between the detector and the signal processor enables the detector to pass any signal it receives, including any modulated signal, to the signal processor for analysis and/or processing.

In some embodiments, the signal processor applies filters to the detected signal.

Each arm of the Mach Zehnder interferometer is unguided (non-guided) in that the laser detection system is an open system and does not comprise any waveguides. Where the system is operated in free space, each arm therefore comprises beams which pass from one optical component to another, via free space.

Advantageously, 'Free space' interferometers such as that of the present invention will have a significantly wider field of view than a fiber (waveguide) based system.

Optional features of the invention will now be set out. These are applicable singly or in any combination with any aspect of the invention.

Optionally, the modulation stage is a piezoelectric actuated mirror. Upon application of a voltage, a piezoelectric mount upon which the mirror is mounted will undergo a dimensional change which, in turn will cause the mirror to become displaced, thereby lengthening or reducing the path length of the second arm of the Mach Zehnder interferometer.

In some embodiments, the modulation stage may take the form of a mirror which can be tilted to affect the resulting interference pattern when the two arms are recombined at the second beam splitter. The mirror tilt may be controlled by a MEMS (microelectromechanical systems) device.

In some embodiments, the modulation stage may be an electro optic phase modulator. In such embodiments, light couples into and out of the electro optic phase modulator from free space without the presence of waveguides. The electro optic phase modulator is capable of higher rates of modulation (e.g. 10 MHz) as compared to the rate of modulation for a piezoelectric actuated mirror (e.g. a few kHz).

Optionally, a retroreflector may be located at the second output.

In this way, the light will be reflected by the retroreflector back into the Mach Zehnder interferometer. This reflected light, or at least a portion of it, will undergo a second modulation at the modulation stage before exiting the laser detection system via the original input of the Mach Zehnder interferometer. The modulated light from the original input is sent back towards the original source of light, thereby providing a mechanism of communication since it can enable the communication of information from the modulator back to the light source, at the same time as detecting the presence of the source laser. In one example, the information communicated back to the source could be a unique identification code.

The retroreflector may take the form of any reflective component which acts to reflect incident light back towards the source of the light such that the wavefront of light reflected back towards the source is parallel to but opposite in direction from the wavefront of the incident light. In some embodiments, the retroreflector may be a corner cube retroreflector.

Optionally, the detection stage comprises a position sensitive detector.

Optionally, the position sensitive detector is an area detector (sometimes referred to as a square area detector).

An area detector may take the form of a light detector (usually square or rectangular shaped) which can be distinguished from a point detector in that it has detection elements at each of its four corners or sides. The area detector combines signals taken from each of the four corners/sides to read out the position of a localized light spot on the surface of the detector. When such a position sensitive detector is used, components of a modulated light signal will be detected by each one of the four detectors. These four modulating components of the four position sensitive signals can be used to infer the direction from which the light has reached the detector, and therefore the direction of the original source of light. The horizontal and vertical position of an incident spot can be obtained by, for example, comparing the amount of signal exiting the top corners and the bottom corners compared to the total detected signal, in order to determine a vertical location. The same is true for horizontal position using left and right corners.

In some embodiments described herein, measurements made are of the modulating signals only (i.e. not measurements of the total signals, which could be much larger). In this way, it is possible to locate the modulating source on the detector (i.e. the laser spot). This position of a modulating component may be determined separately from the location of any non-modulating readings on the detector (e.g. by comparing the detected positions. When the detector is placed in an imaging system, the direction from which the source originates can be determined from the modulating spot position.

Background light which is spectrally broad and spatially distributed will not interfere to create a modulating signal at the detector, so the position detection will discriminate against any background information and will only give information on the direction of any coherent light.

Optionally, a second detector is located at the second output.

Where a second detector is located at the second output, the range of wavelengths over which the second detector can detect may be different from the range of wavelengths over which the first detector can detect. For example, the first detector may detect infra-red wavelengths whereas the second detector may detect visible wavelengths. In this way, there is a beneficial broadening in the overall spectral range of coherent wavelengths that can be detected by the laser detection system. A large spectral coverage is provided by a single system.

Where identical detectors are placed at the first and second output ports, the first detector and the second detector can be made to form a balanced detector pair. In this way, the first detector and second detector can work together in that common DC levels caused by background light will be received by both detectors, so can be removed from the combined output. Light from the first output will be 180° out of phase with light from the second output. Beneficially, this means that the two modulated outputs from the respective ports are 180° out of phase and that the difference signal produced by the balanced pair can be double that of a single detector. Detection sensitivity may therefore be improved.

According to a second aspect of the present invention, there is provided a two-way communication system comprising: a Mach Zehnder interferometer, the Mach Zehnder interferometer comprising: an entry beam splitter for splitting incident light into a first arm, having an arm length L1 and a second arm having an arm length L2; a modulation stage for receiving a modulation signal and applying a phase difference to the second arm, the magnitude of the phase difference depending upon the magnitude of the modulation signal; an exit beam splitter for recombining light from the first arm with light from the second arm to create a first output and a second output; a detection stage comprising a first detector at the first output for detecting intensity modulation caused by interference of the recombined light; a retroreflection stage at the second output; and a signal processor communicably connected to both the modulation stage and the detection stage.

Where physically possible, any of the optional features described above in relation to the first aspect could also be applied to the second aspect of the present invention.

According to a third aspect of the present invention, there is provided a method of two way communication between a first entity and a second entity, the method comprising: providing a laser detection system, the laser detection system comprising: a Mach Zehnder interferometer, the Mach Zehnder interferometer comprising: an entry beam splitter for splitting incident light into a first arm, having an arm length L1 and a second arm having an arm length L2; a modulation stage for receiving a modulation signal and applying a phase difference to the second arm, the magnitude of the phase difference depending upon the magnitude of the modulation signal; an exit beam splitter for recombining light from the first arm with light from the second arm to create a first output and a second output; a detection stage comprising a first detector at the first output for detecting intensity modulation caused by interference of the recombined light; a retroreflection stage at the second output; and a signal processor communicably connected to both the modulation stage and the detection stage. The method also includes receiving light at the laser detection system from the first entity and encoding the modulation signal with information to be sent to the first entity via the retroreflector.

Optionally, the information encoded into the modulation signal is a unique identification code.

Again, where physically possible, any of the optional features described above in relation to the first aspect could also be applied to the third aspect of the present invention.

Further optional features of the invention are set out below.

BRIEF DESCRIPTION OF THE DRAWINGS

Embodiments of the invention will now be described by way of example with reference to the accompanying drawings in which:

FIGS. 3A-3C show three alternative application dependent devices that can be located at the second output port of any of the embodiments described herein.

DETAILED DESCRIPTION OF THE INVENTION

A first embodiment of a laser detection system according to the present invention is described below in relation to FIGS. 1 and 3A-3C.

Figure 1:
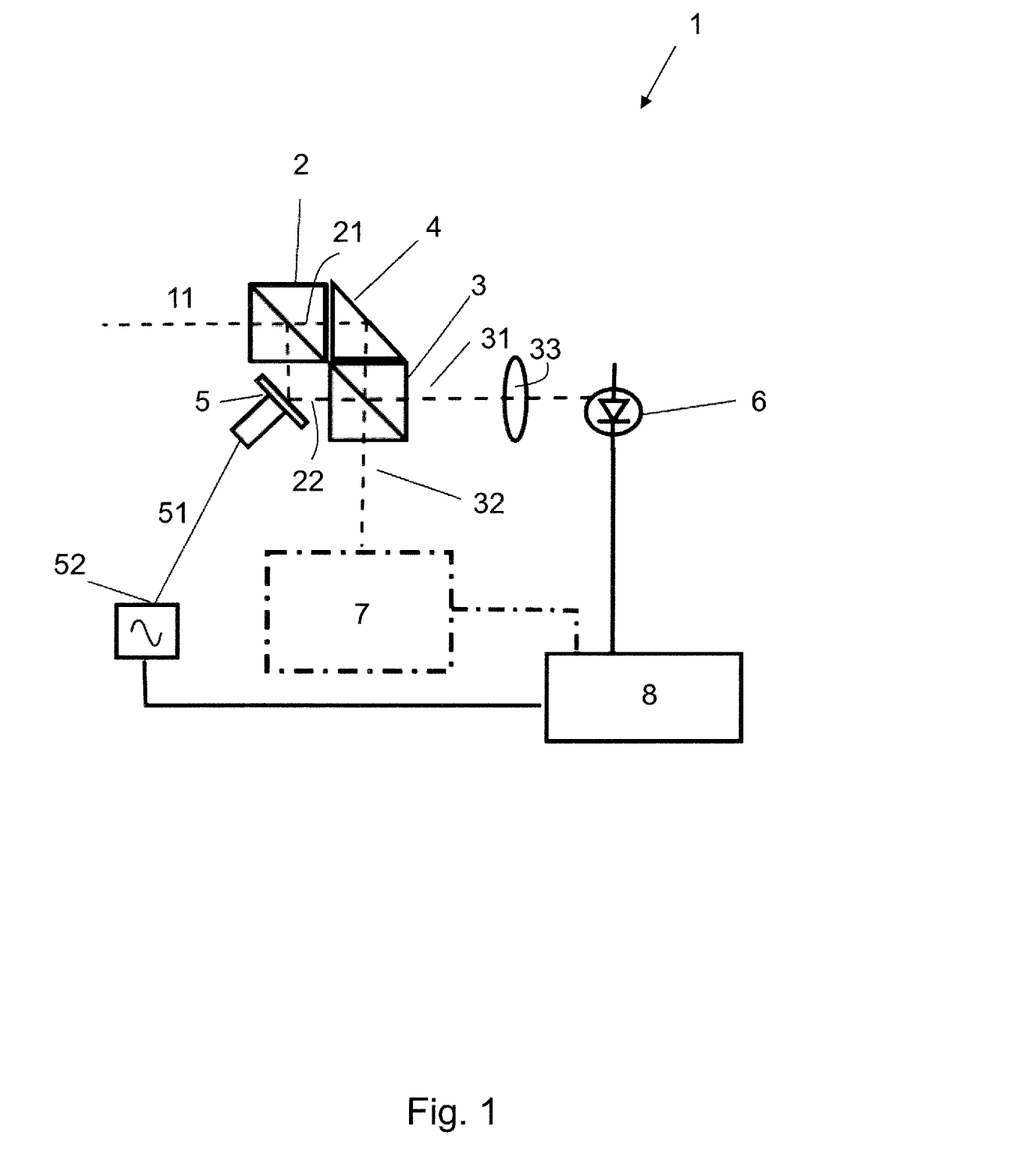
FIG. 1 shows a schematic diagram of a first embodiment of a laser detection system according to the present invention.

The laser detection system 1 comprises a plurality of optical components arranged to provide a Mach Zehnder interferometer. The input of the Mach Zehnder interferometer is formed by a beam splitter 2 (the "entry beam splitter") which splits any incident light 11 into a first arm 21, having an arm length L1 and a second arm 22 having an arm length L2. The beam splitter will typically have a 50:50 split ratio and may take the form of a non-polarizing cube beam splitter. The bandwidth of the beam splitter chosen will depend upon the wavelengths of incident light that the laser detection system aims to detect.

A second beam splitter 3 (the "exit beam splitter") recombines light from the first arm with light from the second arm and creates a first output 31 of the interferometer and a second output 32 of the interferometer. In the embodiment shown in FIG. 1, the direction of propagation of light of the first input 31 is at right angles, or substantially at right angles to the direction of propagation of the second input 32.

Light in the first arm 21 of the interferometer propagates from the entry beam splitter in a first direction and is reflected by a tuning mirror 4 onto a face of the second beam splitter. Light in the second arm 22 of the interferometer propagates from the entry beam splitter in a second direction and is reflected by a modulation stage 5 onto an alternative face of the second beam splitter. In the embodiment shown in FIG. 1, the modulation stage takes the form of a piezoelectric actuated mirror. The piezoelectric actuated mirror may take the form of any mirror with a suitable reflection bandwidth (depending on the wavelength of light to be detected), the mirror being mounted upon a piezo controlled mount so that a current applied to the mount will cause the mirror to move, therefore shortening or lengthening the path length of the second arm L2 so as to apply a phase difference to the second arm.

The modulation stage 5, receives a modulation signal 51 from a signal generator 52 and the piezoelectric mount moves by an amount proportional to the magnitude of the modulation signal received. This means that the magnitude of the phase difference induced in the second arm of the interferometer depends upon the magnitude of the modulation signal.

The Mach Zehnder interferometer includes a detection stage 6 located at the first output 31. This detection stage comprises a first detector. Since the first output 31 will comprise components from both the first arm 21 and the second arm 22, any coherent light (i.e. laser light) present in the incident light 11 will give rise to interference when spatially and temporally overlapped. The light exiting through the first output 31 and incident upon the first detector 6 will only exhibit an intensity modulation due to the phase difference imparted between the two arms of the interferometer if the coherence length of the incoming light is longer than the path difference between the two interferometer arms. This may be ensured, for example, by the use of a turning prism as the turning mirror, where the optical path length in solid material is longer than the equivalent path in air. Any intensity modulation present on the detector signal is detected by suitable signal processing means and is thus evidence that a source of coherent light has been detected.

Figure 3A:
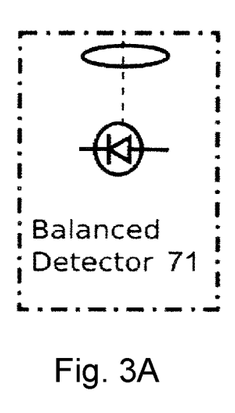
FIG. 3A depicts a balanced second detector.
Figure 3B:
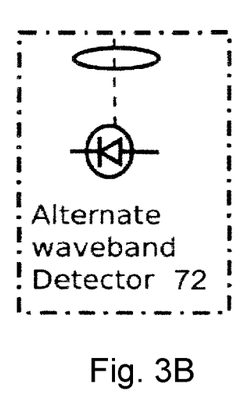
FIG. 3B depicts an alternative waveband second detector.

The resulting interference will be picked up by the detector of the detection stage as a variation in the intensity. Any intensity modulation present at the first detector and is therefore evidence that a source of coherent light has been detected from the input 11 of the laser detection device. A focusing lens or other optical component may be used to focus light from the first output onto the detector 6. As shown in FIG. 3A and FIG. 3B, similar focusing optics may also be present at the second output, to focus light from the second output 32 onto a second detector 71, 72.

An application dependent device 7 is located at the second output 32. Three different examples of application dependent devices can be seen in FIGS. 3A-3C, each of which could be located at the second output 31 of the laser detection system 1 shown in FIG. 1.

A first example of an application dependent device is shown in FIG. 3A in the form of a second detector 71 which acts in unison with the first detector 6 to form a balanced detector pair which can remove common DC levels, caused by background light, from the combined output. The modulated outputs from the respective first and second outputs 31, 32 will be out of phase by 180° and thus the difference signal produced by the balanced pair can be double that of a single detector; that is to say, detection sensitivity is improved.

A second example of an application dependent device is shown in FIG. 3B in the form of a second detector 72, wherein the range of wavelengths over which the second detector can detect is different from the range of wavelengths over which the first detector can detect. By selecting a second detector with an alternate waveband for location at the second output port, the overall functioning bandwidth of the laser detection device is increased, i.e. the spectral range of coherent sources that can be detected will have been broadened.

The second detector 72 could, for example take the form of a detector which detects infra-red radiation whereas the first detector 6 could be a detector of visible light.

Figure 3C:
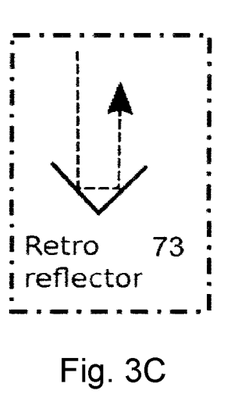
FIG. 3C depicts a retroreflector.

A third example of an application dependent device for location at the second output 32 is shown in FIG. 3C in the form of a retroreflector 73.

Light from the second output 32 will be reflected by the retroreflector back into the second arm of the Mach Zehnder interferometer but in the opposite direction. This reflected light, or at least a portion of it, will undergo a second modulation at the modulation stage before exiting the laser detection system via the original input 11 of the Mach Zehnder interferometer 1. Since the modulated light is sent back towards the original source of light, the laser detection system can therefore also function as a mechanism of communication since it can enable the communication of information from the modulator back to the light source, at the same time as detecting the presence of the source laser. In one example, the information communicated back to the source could be a unique identification code.

Where the input interrogating light were also modulated with a unique identification code this could be used to identify the interrogator. A method of encoding could be used that can disentangle two overlaid codes, such as the one recently described in Benton, David M. "Concurrent codes: A holographic-type encoding robust against noise and loss." PloS one 11.3 (2016), or the use of a code division multiple access code as used in mobile communications.

The laser detection system of FIG. 1 includes a signal processor 8 which is communicably connected to both the modulation stage and the detection stage.

The signal processor is configured to extract the potentially small modulation signal generated by the interference, the small modulation signal sitting atop a large DC broad background signal. An example of such a configuration is the use of a phase sensitive detector (PSD) whereby the output signal 31 is multiplied by the modulation (reference) signal with a suitable phase shift applied. The result is low pass filtered and then integrated.

The laser detection system is capable of observing modulating signals that are very much weaker than the background noise. By generating harmonics of the reference modulation signal, wavelength information can also be extracted.

The harmonics can arise in the signal where the interferometer and modulation amplitude are set such that it results in a pi/2 phase change at the longest wavelength that the system can detect.

If a wavelength shorter than this enters the interferometer it will undergo a phase change greater than pi/2. That is to say, the intensity will begin to decrease before the modulation frequency has reached its peak. This phase change introduces harmonics into the detected signal (as can be seen in more detail below in relation to equation 10). The amplitude of any given harmonic will depend on the input wavelength, hence allowing us to determine that wavelength. These harmonics can be determined directly by taking the Fourier transform of the sampled detector signal.

In other embodiments, a PSD can be used to analyze the harmonics. The PSD may be separate from and in addition to a more conventional detector. Where PSD is used, a detected signal would be multiplied by the harmonic of the modulation system and then integrated. This could be carried out digitally, in which case a digital version of the harmonic signal would first be generated before preforming the phase sensitive detection.

As described in more detail in the theory section below, the size of the harmonic terms can be determined since they are dependent upon the amplitude of the modulating voltage and the wavelength. For a known value of the modulating voltage, the signal processor can therefore calculate the wavelength of the modulating light by measuring the harmonic amplitudes. This may include programming the signal processor to measure and to output a ratio of the harmonic amplitudes.

Signal processing can take place in either analog or digital form.

An alternative form of signal processing may involve capturing a time series of samples of the output from a detector and performing a Fourier transform to reveal the frequencies present. This can identify the amplitudes of modulating harmonic components present and enables wavelength discernment. Specifically, a filter can be applied to the Fourier transformed output to pick out only those frequencies found in the modulation signal. A Fourier transform-based method of signal processing is much simpler to implement than the multiplication PSD method described above, particularly in the digital domain.

In other embodiments, identification of a modulating signal can be detected by direct observation of the modulation in the detector output. In such a case, the modulating signal would usually have an easily recognizable form. For example, the modulating signal may take the form of a sine wave.

The modulation signal may have a variable amplitude. In this way, it is possible to better improve the sensitivity of the detector.

The modulation signal may have a variable frequency signal, i.e. the modulation could take the form of a "frequency hopping" signal.

The modulation signal may include a code (e.g. a pulsed code), which can be identified by the signal processor, the signal processor being programmed to identify any correlation between the detector output(s) with the applied modulation code. Observation by the signal processor of a correlation between the applied modulation signal and the detected signal is an indication that a laser is present. In embodiments which include a retroreflector, the same modulation code would be present on any retro reflected output and could be used to identify the laser detection device.

In some scenarios, dual modulation is applied to a signal. For example, when the input laser signal received by the laser detection system already has a modulation (e.g. a pulse code modulation) of its own, the modulation applied by the modulation stage of the laser detection system will be a second modulation.

For dual modulation scenarios, the analysis carried out by the signal processor will be more complex because the method of encoding carried out by the signal processor should be capable of disentangling two overlaid codes, that is to say, two "concurrent codes". A level of digital signal processing will be required. A simple and practical scheme for concurrent coding is presented in Benton, David M. "Concurrent codes: A holographic-type encoding robust against noise and loss." PloS one 11.3 (2016): e0150280.

Another alternative would be to use a code division multiple access (CDMA) encoding system such as is widely used in mobile communications networks. In this case a sender's data is combined with a sender's identification code before being combined with other senders combined codes. Individual sender's data can be extracted by correlation with the sender's unique code.

As an initial step, correlation by the signal processor of the detected code with the modulation code identifies the presence of the input laser. Subsequent removal of the modulation code is then carried out; for example by applying an XOR cipher to the signal from the detector(s) to reveal the laser code, thereby enabling identification of the input laser source.

Where the laser detection system 1 includes a first detector 6 at the first output 31 and a second detector 7 in the form of a balanced detector 72 at the second output 32, the use of a balanced pair of detectors can be used to subtract common bright background components present on both detectors thereby reducing the dynamic range required in subsequent amplification stages. In addition, the modulated signals from each port are in antiphase which advantageously increases the size of the subsequent modulation on the difference signal by a factor of 2, thereby improving detection sensitivity.

The amplitude of the response to a coherent source is dependent upon the amplitude of the modulation signal being imposed and the wavelength of the incoming light. Thus a fixed modulation amplitude will provide an optimum response for a single wavelength. Given that determination of wavelength is a desirable objective this approach will limit that capability; making discrimination more difficult if the modulation is too small. Therefore, finding the optimum modulation amplitude could be achieved by progressively incrementing the modulation amplitude thereby achieving the maximum modulation response. This could also be used a means of identifying the input wavelength.

The mechanism of applying a phase modulation within the interferometer can therefore be used to apply a specific code (binary or analog) to the modulation stage and thus to the output signal. This same code could be detected by means of a correlation of the output signal with the reference modulation code. A positive correlation is indicative of the presence of coherent light passing into the interferometer. As described above, in such "dual modulation" embodiments, the signal processor will require digital signal processing.

A second embodiment of a laser detection system according to the present invention is described below in relation to FIG. 2, again also in relation to FIGS. 3A-3C which depicts three possible application dependent devices suitable for use with the second embodiment.

Figure 2:
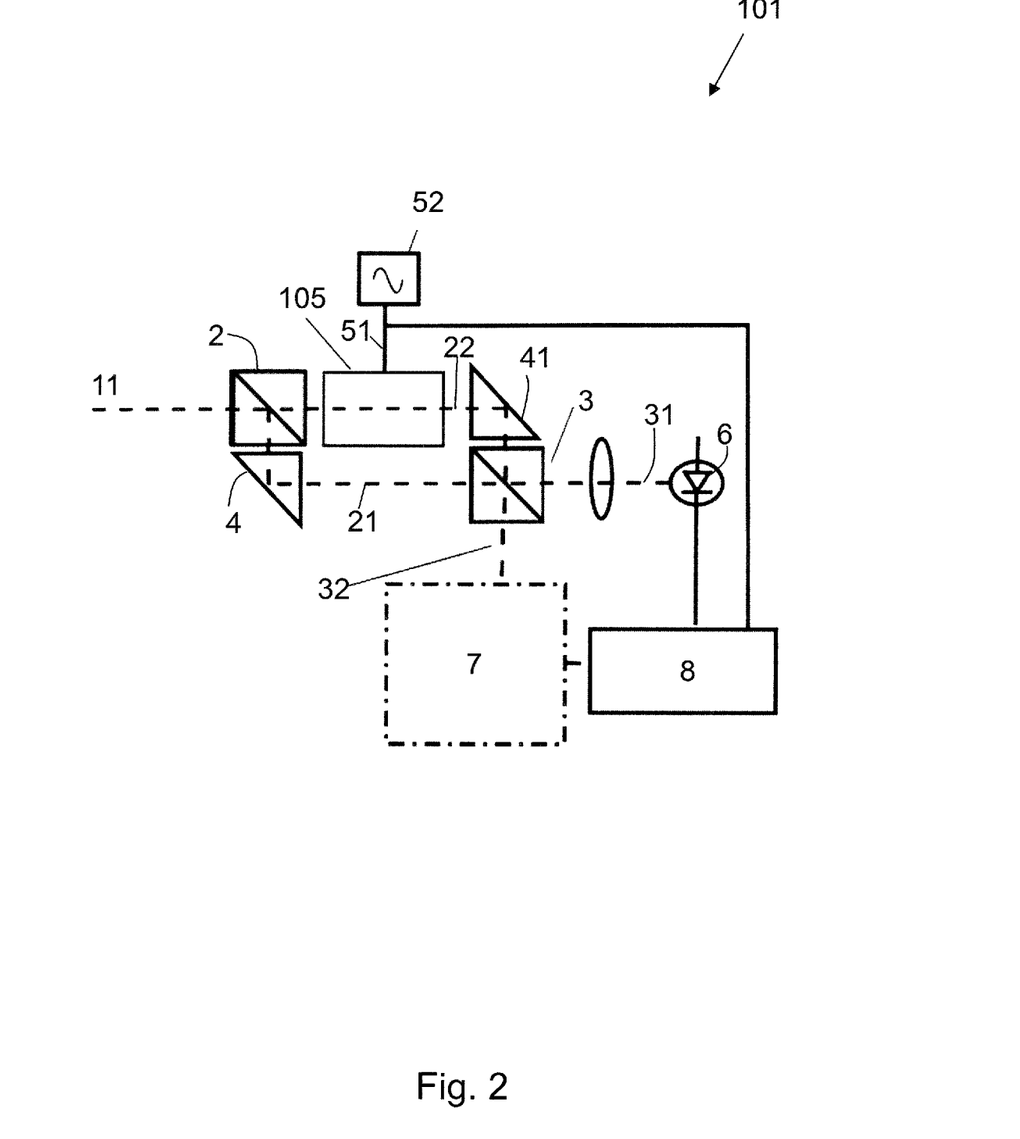
FIG. 2 shows a schematic diagram of a second embodiment of a laser detection system according to the present invention.

The laser detection system of the second embodiment 101 differs from the laser detection system of the first embodiment 1 in that the modulation stage of the second arm comprises an electro optic phase modulator 105 (rather than a piezo mounted mirror 5). Since the modulation stage no longer includes a mirror, a fixed mirror 41 is included in the second arm 22 of the interferometer to reflect light from the output of the electro optic phase modulator onto an input face of the second beam splitter 3. A voltage applied to the electro optic phase modulator results in a controllable phase delay in the second arm relative to the first arm. The electro optic phase modulator is typically a commercially bought modulator such as a Lithium Niobate device which operates under the Franz-Keldysh effect.

An advantage of the system of FIG. 2 is the fact that the resulting laser detection system will be capable of significantly higher rates of modulation (typically 10 MHz as opposed to a few kHz). This could be particularly beneficial in some communication applications.

Theory

Consider a Mach Zehnder interferometer with arm lengths L1 and L2 which need not be equal, and a piezo driven mirror in arm 2 such that L2 varies with time (t). The amplitude of an electromagnetic wave of frequency $\omega$, wavelength $\lambda$ and amplitude E, split between the 2 arms is:

$$A_1 = E(1 - R(\lambda))\cos\left(\omega t + \frac{2\pi}{\lambda}L_1\right) \quad (1$$

$$A_2 = ER(\lambda)\cos\left(\omega t + \frac{2\pi}{\lambda}L_2(t)\right) \quad (2$$

Where $R(\lambda)$ is a wavelength dependent reflectivity for the beamsplitters. When recombined at a detector D following the second beamsplitter, the amplitude at the detector is $$A_d = R(\lambda)A_1 + (1-R(\lambda))A_2 \quad (3$$

The detector measures the time averaged intensity $$I_d = \frac{1}{T}\int_0^T \langle A_d^2 \rangle \quad (4$$

Which results in a temporally varying intensity $$I_d = \frac{(E(1 - R(\lambda))R(\lambda)\gamma)^2}{T}[1 + \cos(k(\Delta L(t)))] \quad (5$$

Where $\gamma$ is a factor representing reflection loss, $k=2\pi/\lambda$ and $\Delta L$ is the difference $L_1-L_2(t)$.

The piezo mirror is subject to a sinusoidal modulation voltage of amplitude $v_m$ and frequency $f_m$. The response of the piezo is p μm/V and the path length change that is generated is increased by a factor $\sqrt{2}$ due to the mirror being at a 45° angle. Thus the path length difference is:

$$\Delta L(t) = L_1 - L_2(0) - v_m p\sqrt{2}\sin(2\pi f_m t) - v_{off} p\sqrt{2} \quad (6$$

Where $v_{off}$ is a dc offset voltage applied to the mirror.

Combining constant terms into a factor C the detector intensity can be written $$I_d = \frac{(E(1-R(\lambda))R(\lambda)\gamma)^2}{T}[1+\cos(k(v_m p\sqrt{2}\sin(2\pi f_m t))+C)] \quad (7$$

By choosing the offset voltage such that effectively $C=\pi/2$ we arrive at the form $$I_d = \frac{(E(1-R(\lambda))R(\lambda)\gamma)^2}{T}[1+\sin(kv_m p\sqrt{2}\sin(2\pi f_m t))] \quad (8$$

Using the Bessel function identity $$\sin(z\sin\theta)=2\Sigma_{k-1}{}^n(-1)^k J_{2k+1}(z)\sin((2k+1)\theta) \quad (9$$

Where the functions $J_k$ are Bessel functions of the first kind, the intensity at the detector can thus be represented in terms of harmonics of the modulation frequency.

$$I_d=I_0[1-2J_1(kv_m p\sqrt{2})\sin(2\pi f_m t)-2J_3(kv_m p\sqrt{2})\sin(2\pi 3f_m t)+\ldots] \quad (10$$

The initial multiplying terms have been incorporated into the single term $I_0$.

The size of the harmonic terms is determined by the Bessel functions which are dependent upon the amplitude of the modulating voltage ($v_m$) and the wavelength (through k). Therefore for a known value of $v_m$ the wavelength can be obtained by measuring the harmonic amplitudes. Because Bessel functions will have multiple solutions wavelength is best estimated by considering a ratio of the harmonic amplitudes. The power spectrum of the sampled output waveform produces terms proportional to the square of the Bessel function amplitudes and thus the ratio of the third harmonic to the modulation frequency is given by $$H_{13} = \frac{J_3(kv_m p\sqrt{2})^2}{J_1((kv_m p\sqrt{2})^2} \quad (11$$

Low coherence interferometry (LCI) and optical coherence tomography (OCT) are techniques that utilize optical sources with a limited coherence length such as LEDs where the spectral bandwidth might be of the order 10 nm. By controlling the length of a reference arm within an interferometer, interference effects can only be observed when the arm lengths match to within the coherence length of the source. Equally no interference effects can be observed from broadband sources if the difference in arm length is deliberately made longer than the coherence length. In this way a detector for laser radiation, where coherence lengths can be long, can discriminate against bright broadband sources which cannot contribute to the modulation signal.

The coherence length of a source with central wavelength $\lambda$ and spectral width $\Delta\lambda$ is given approximately by $$l_c = \frac{\lambda^2}{2\Delta\lambda} \quad (12$$

For visible light with a wavelength of 600 nm and a spectral width of 400 nm the coherence length is of the order 0.5 μm.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

What is claimed is:

1. A laser detection system comprising:
   a Mach Zehnder interferometer, the Mach Zehnder interferometer comprising:
   an entry beam splitter for splitting incident light into a first arm, having an arm length L1 and a second arm having an arm length L2;
   a modulation stage for receiving a modulation signal and applying a phase difference to the second arm, a magnitude of the phase difference depending upon a magnitude of the modulation signal;
   an exit beam splitter for recombining light from the first arm with light from the second arm to create a first output and a second output;
   a detection stage comprising a first detector at the first output for detecting intensity modulation caused by interference of the recombined light;
   a signal processor communicably connected to both the modulation stage and the detection stage; and
   a retroreflector located at the second output.

2. The laser detection system of claim 1, wherein the modulation stage comprises at least one of a piezoelectric actuated mirror or an electro optic phase modulator.

3. The laser detection system of claim 1, wherein the detection stage comprises a position sensitive detector.

4. The laser detection system of claim 3, wherein the position sensitive detector comprises a square area detector.

5. The laser detection system of claim 1, further comprising a second detector located at the second output, wherein the first detector and the second detector form a balanced detector pair.

6. The laser detection system of claim 1, wherein one or more harmonics of the modulation signal are generated and processed by the signal processor to determine a wavelength of the incident light.

7. A two-way communication system comprising:
   a Mach Zehnder interferometer, the Mach Zehnder interferometer comprising:
   an entry beam splitter for splitting incident light into a first arm, having an arm length L1 and a second arm having an arm length L2;
   a modulation stage for receiving a modulation signal and applying a phase difference to the second arm, a magnitude of the phase difference depending upon a magnitude of the modulation signal;
   an exit beam splitter for recombining light from the first arm with light from the second arm to create a first output and a second output;
   a detection stage comprising a first detector at the first output for detecting intensity modulation caused by interference of the recombined light;
   a retroreflection stage at the second output; and
   a signal processor communicably connected to both the modulation stage and the detection stage.

8. The two-way communication system of claim 7, wherein the modulation stage comprises at least one of a piezoelectric actuated mirror or an electro optic phase modulator.

9. The two-way communication system of claim 7, wherein the detection stage comprises a position sensitive detector.

10. The two-way communication system of claim 9, wherein the position sensitive detector comprises a square area detector.

11. The two-way communication system of claim 7, further comprising a second detector is located at the second output.

12. A method of two way communication between a first entity and a second entity, the method comprising:
  providing a laser detection system, the laser detection system comprising:
    a Mach Zehnder interferometer, the Mach Zehnder interferometer comprising:
      an entry beam splitter for splitting incident light into a first arm, having an arm length L1 and a second arm having an arm length L2;
      a modulation stage for receiving a modulation signal and applying a phase difference to the second arm, a magnitude of the phase difference depending upon a magnitude of the modulation signal;
      an exit beam splitter for recombining light from the first arm with light from the second arm to create a first output and a second output;
      a detection stage comprising a first detector at the first output for detecting intensity modulation caused by interference of the recombined light;
      a retroreflection stage at the second output; and
      a signal processor communicably connected to both the modulation stage and the detection stage;
  receiving light at the laser detection system from the first entity; and
  encoding the modulation signal with information to be sent to the first entity via the retroreflection stage.

13. The method of claim 12, wherein the information encoded into the modulation signal comprises a unique identification code.

14. The method of claim 12, wherein the modulation stage comprises a piezoelectric actuated mirror or an electro optic phase modulator.

15. The method of claim 12, wherein the detection stage comprises a position sensitive detector.

16. A laser detection system comprising:
  a Mach Zehnder interferometer, the Mach Zehnder interferometer comprising:
    an entry beam splitter for splitting incident light into a first arm, having an arm length L1 and a second arm having an arm length L2;
    a modulation stage for receiving a modulation signal and applying a phase difference to the second arm, a magnitude of the phase difference depending upon a magnitude of the modulation signal;
    an exit beam splitter for recombining light from the first arm with light from the second arm to create a first output and a second output;
    a detection stage comprising a first detector at the first output for detecting intensity modulation caused by interference of the recombined light;
    a signal processor communicably connected to both the modulation stage and the detection stage; and
    a second detector located at the second output, wherein a range of wavelengths over which the second detector can detect is different from a range of wavelengths over which the first detector can detect.

17. The laser detection system of claim 16 wherein the modulation stage comprises at least one of a piezoelectric actuated mirror or an electro optic phase modulator.

18. The laser detection system of claim 16 the detection stage comprises a position sensitive detector.

19. The laser detection system of claim 18 wherein the position sensitive detector comprises a square area detector.

20. The laser detection system of claim 16 wherein one or more harmonics of the modulation signal are generated and processed by the signal processor to determine a wavelength of the incident light.

* * * * *